United States Patent [19]

Hart

[11] 4,186,814
[45] Feb. 5, 1980

[54] MOTOR GRADER ROADWHEEL ARRANGEMENT

[75] Inventor: Cullen P. Hart, Peoria, Ill.

[73] Assignee: Caterpillar Tractor Co., Peoria, Ill.

[21] Appl. No.: 863,967

[22] Filed: Dec. 23, 1977

[51] Int. Cl.² .................... B60G 19/06; B62D 7/06
[52] U.S. Cl. ............................... 180/24; 180/23; 180/24.01; 180/24.02; 180/140; 280/6 H; 280/683; 280/693; 280/702
[58] Field of Search ............. 180/23, 24, 24.02, 44 F, 180/24.01, 140; 280/683, 678, 704, 6 H, 6.1, 702

[56] References Cited

U.S. PATENT DOCUMENTS

| D. 235,113 | 5/1975 | Hendrickson | D40/5 |
| 2,748,509 | 6/1956 | Brown et al. | 180/140 |
| 3,387,684 | 6/1968 | Belke et al. | 180/24.01 |
| 3,486,576 | 12/1969 | Breon et al. | 180/24.01 |
| 3,565,455 | 2/1971 | Kostas | 280/672 |
| 3,752,498 | 8/1973 | Shea et al. | 267/64 R |
| 3,831,693 | 8/1974 | King | 180/51 |
| 3,970,327 | 7/1976 | Dezelan | 280/6 H |
| 3,983,950 | 10/1976 | Fabian | 180/44 F |

FOREIGN PATENT DOCUMENTS 1311646 3/1973 United Kingdom ............... 280/702

Primary Examiner—Joseph F. Peters, Jr.
Assistant Examiner—Donn McGiehan
Attorney, Agent, or Firm—Phillips, Moore, Weissenberger, Lempio & Majestic

[57] ABSTRACT

A construction vehicle has pairs of tandem roadwheels on each side thereof. The pairs of tandem roadwheels are simultaneously coordinatively anglable relative to the frame to accomplish steering thereof. The roadwheels are mounted to strut cylinders which act as kingpins therefor. A linkage is provided that allows for simultaneous coordinative angling of the roadwheels through pivoting at the kingpins.

15 Claims, 4 Drawing Figures

MOTOR GRADER ROADWHEEL ARRANGEMENT

BACKGROUND OF THE INVENTION

1. Field of the Invention

The invention relates to a tandem roadwheel system as employed on a construction vehicle such as a motor grader.

2. Prior Art

A motor grader is ofttimes operated on uneven terrain whereby the tandem roadwheels on one lateral side of the vehicle are displaced vertically relative to the tandem roadwheels mounted on the opposite lateral side of the vehicle. Also, the tandem roadwheels on one side of the vehicle may individually be placed at different vertical positions relative to one another because one of the roadwheels may be riding over a rock, dipping into a ditch or the like. The resulting tilting of the vehicle may thus give rise to operational problems such as reduced tractive effort of the vehicle and a reduction in drawbar pull. In addition, conventional tandem mounted rubber tires employed on conventional motor graders essentially function as undamped springs which would not provide the suspension properties desired for earthworking operations. Further, equal roadwheel loading is generally not provided under all conditions in a motor grader. Still further, motor graders normally do not provide means for levelling the main frame and operator's station structure when the vehicle is traversing an angled side slope for the purpose of grading it. This causes operator discomfort and resulting decreased productivity.

Motor graders are generally articulated between a first pair of steerable roadwheels and a tandem roadwheel arrangement. Generally only the first pair of roadwheels are steerable whereby the articulation is desirable. This of course increases the cost of the vehicle as well as providing several structural problems such as passing hydraulic lines and mechanical connections across the articulation. It would be advantageous to have a motor grader which was built with a non-articulated frame and whereby steering thereof could be accomplished by making not only the first pair of roadwheels steerable but also the tandem roadwheel arrangement thereof. It would be even more advantageous if this could be accomplished in a relatively straightforward manner and via a relatively rugged structure.

SUMMARY OF THE INVENTION

The present invention is directed to overcoming one or more of the problems as set forth above.

According to the present invention, an improved construction vehicle is provided. In one embodiment of the invention the vehicle comprises a frame having a first pair of steerable roadwheels mounted on opposite lateral sides of and adjacent a first end thereof. A tandem roadwheel arrangement is mounted adjacent a second end of the frame and includes a second pair of steerable roadwheels, one mounted on a first and the other on a second lateral side of the frame and a third pair of steerable roadwheels, one mounted on the first and the other on the second lateral side of the frame intermediate the mounting of the second pair of roadwheels and the second end of the frame. The two roadwheels of the second and third pairs of roadwheels on the first side of the frame comprise a first tandem roadwheel set. Similarly, the two roadwheels of the second and third pairs of roadwheels on the second side of the frame comprise a second tandem roadwheel set. Means are provided for simultaneously coordinatively angling the second and third pairs of roadwheels relative to the frame to accomplish steering thereof. Means are provided for transmitting power to the tandem roadwheel arrangement. Hydraulic cylinders act generally vertically between the frame and each roadwheel and means are provided which cause the roadwheel angling means to simultaneously rotate the rods of the cylinders, thus utilizing the rods of the cylinders as kingpins.

In another sense, the vehicle includes a frame, a tandem roadwheel arrangement, a first pair of steerable roadwheels and power transmitting means as in the previously described embodiment. The linking is as in the previously described embodiment and the roadwheel angling and second and third pair of roadwheels linking means comprises a single motor.

BRIEF DESCRIPTION OF THE DRAWINGS

The invention will be better understood by refrence to the figures of the drawings wherein like numbers denote like parts throughout and wherein.

DETAILED DESCRIPTION OF THE PREFERRED EMBODIMENT

Figure 1:
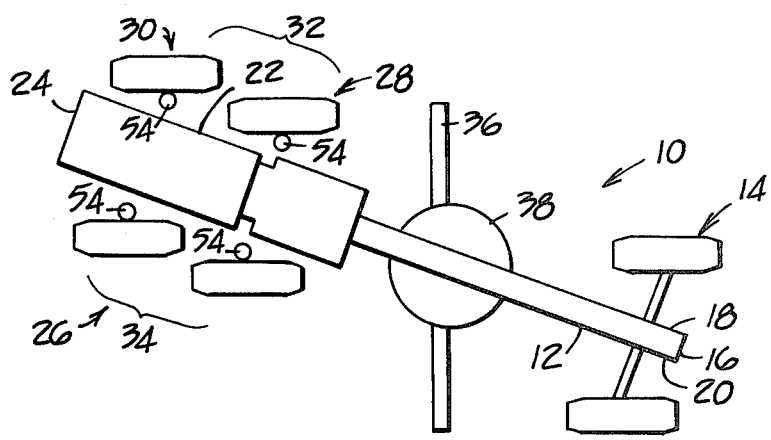
FIG. 1 illustrates, in top view, a motor grader construction vehicle constructed in accordance with the present invention.

Adverting to FIG. 1 there is illustrated therein a motor grader 10 comprising a main frame 12 having a first pair of roadwheels 14 mounted adjacent a first end 16 thereof with one of the pair of roadwheels 14 on a first side 18 of the frame 12 and the other of the roadwheels 14 on a second side 20 of the frame 12. An operator's cab 22 is mounted adjacent a second end 24 of the frame 12. A tandem roadwheel arrangement 26 is located adjacent the second end 24 of the frame 12. The tandem roadwheel arrangement 26 comprises a second pair of steerable roadwheels 28, one mounted on the first side 18 and the other on the second side 20 of the frame 12 along with a third pair of steerable roadwheels 30, one mounted on the first side 18 and the other on the second side 20 of the frame 12 with the third pair of roadwheels 30 being located intermediate the second pair of roadwheels 28 and the second end 24 of the frame 12. The two roadwheels of the second and third pairs of roadwheels 28 and 30 which are on the first side 18 of the frame 12 comprise a first tandem roadwheel set 32. Similarly, the two roadwheels of the second and third pairs of roadwheels 28 and 30 on the second side 20 of the frame 12 comprise a second tandem roadwheel set 34.

Figure 3:
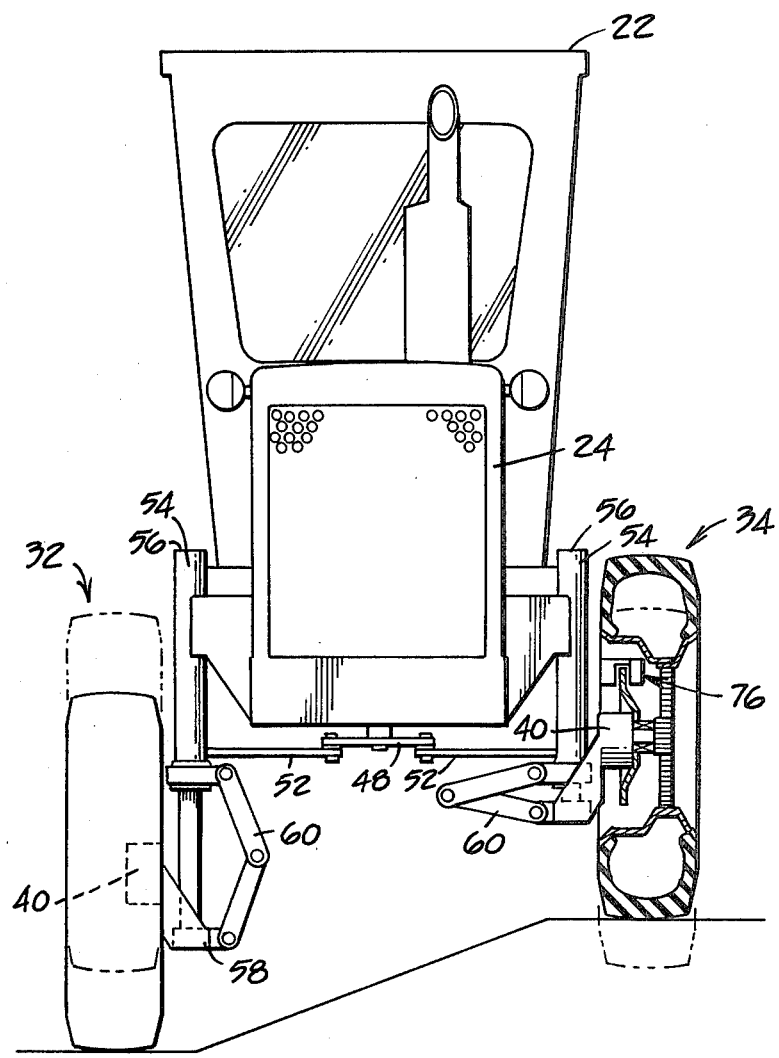
FIG. 3 illustrates, in back view partially in section, a construction vehicle in accordance with the present invention and the final drive and braking arrangement thereof.

The motor grader also comprises a conventional mold board 36 suitably extended beneath the frame 12 by conventional mechanisms including a circle drawbar 38. Means are provided for transmitting rotary power to the tandem roadwheel arrangement 26. For example the power transmitting means can comprise hydraulic motor or electric motor powered means 40, as illustrated in FIG. 3, or a conventional mechanical drive. The power transmitting means powers a planetary final drive gear mechanism in each wheel member as seen in FIG. 3.

Figure 2:
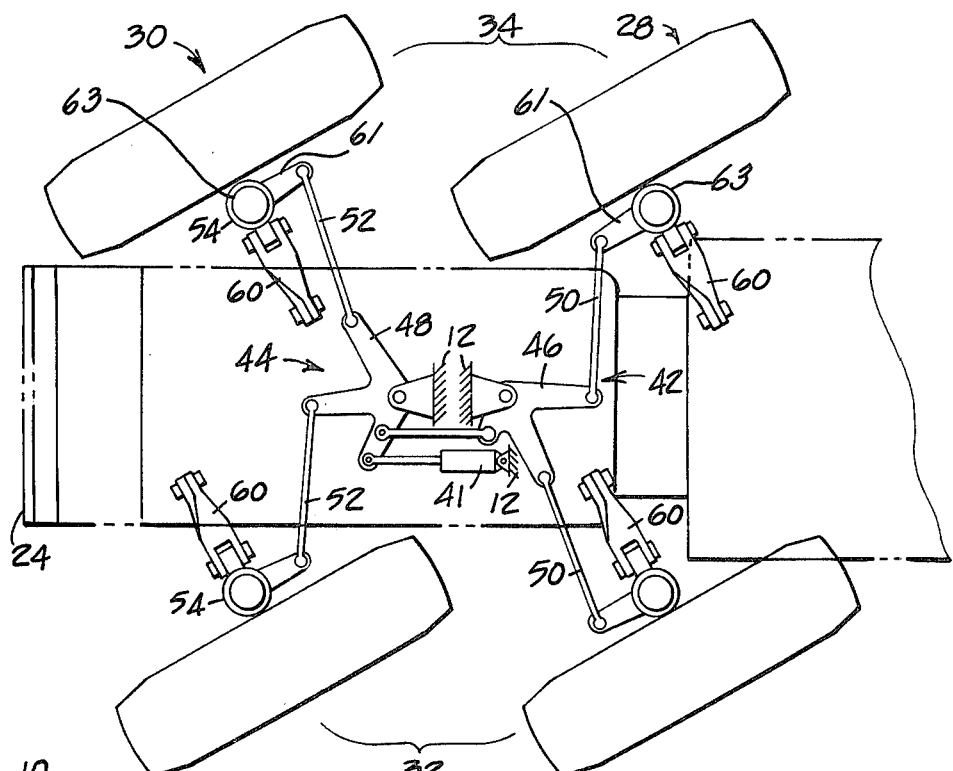
FIG. 2 illustrates, in bottom view, a tandem roadwheel arrangement utilized in the construction vehicle of the present invention.

The preferred means for simultaneously coordinatively angling the second and third pairs of roadwheels 28 and 30 relative to the frame 12 to accomplish steering of the frame 12 is illustrated most clearly in FIG. 2. Briefly, the preferred roadwheel angling means comprises a hydraulic motor 41 acting between the frame 12 and the linkage indicated generally at 42 and 44. As the motor 41 expands and contracts it motivates cranks 46 and 48 which in turn motivate links 50 and 52 and thereby angle each of the second pair of roadwheels 28 and the third pair of roadwheels 30. The various links and cranks are so sized as to produce an equal angling effect at each of the roadwheels.

Each of the roadwheels of the second and third pairs of roadwheels 28 and 30 is individually mounted to the frame 12. The preferred means for individually mounting each of the roadwheels to the frame 12 comprises a four hydraulic strut cylinders 54, one strut cylinder 54 being provided for each of the roadwheels of the second pair 28 and third pair 30. Each strut cylinder 54 acts generally vertically between the frame 12 to which it is generally attached adjacent an end 56 thereof and a respective one of the roadwheels. Referring to FIG. 3 it will be seen that in the preferred embodiment of the present invention the roadwheels will be attached to a rod end 58 and an expandable linkage 60.

Adverting once again to FIG. 2, it will become apparent that movement of the linkage 42, acting via a lever arm 61 upon a circular bearing arrangement 63 attached to the respective expandable linkage 60, will equally rotate each of the rods of the strut cylinders 54 of the second pair of roadwheels 28 while movement of the linkage 44 will simultaneously rotate each of the rods of the strut cylinders 54 of the second pair of roadwheels 30. Thus, it is clear that the strut cylinders 54 act as pivotal kingpins upon which each of the roadwheels of the second pair and third pair of roadwheels 28 and 30 pivot.

Figure 4:
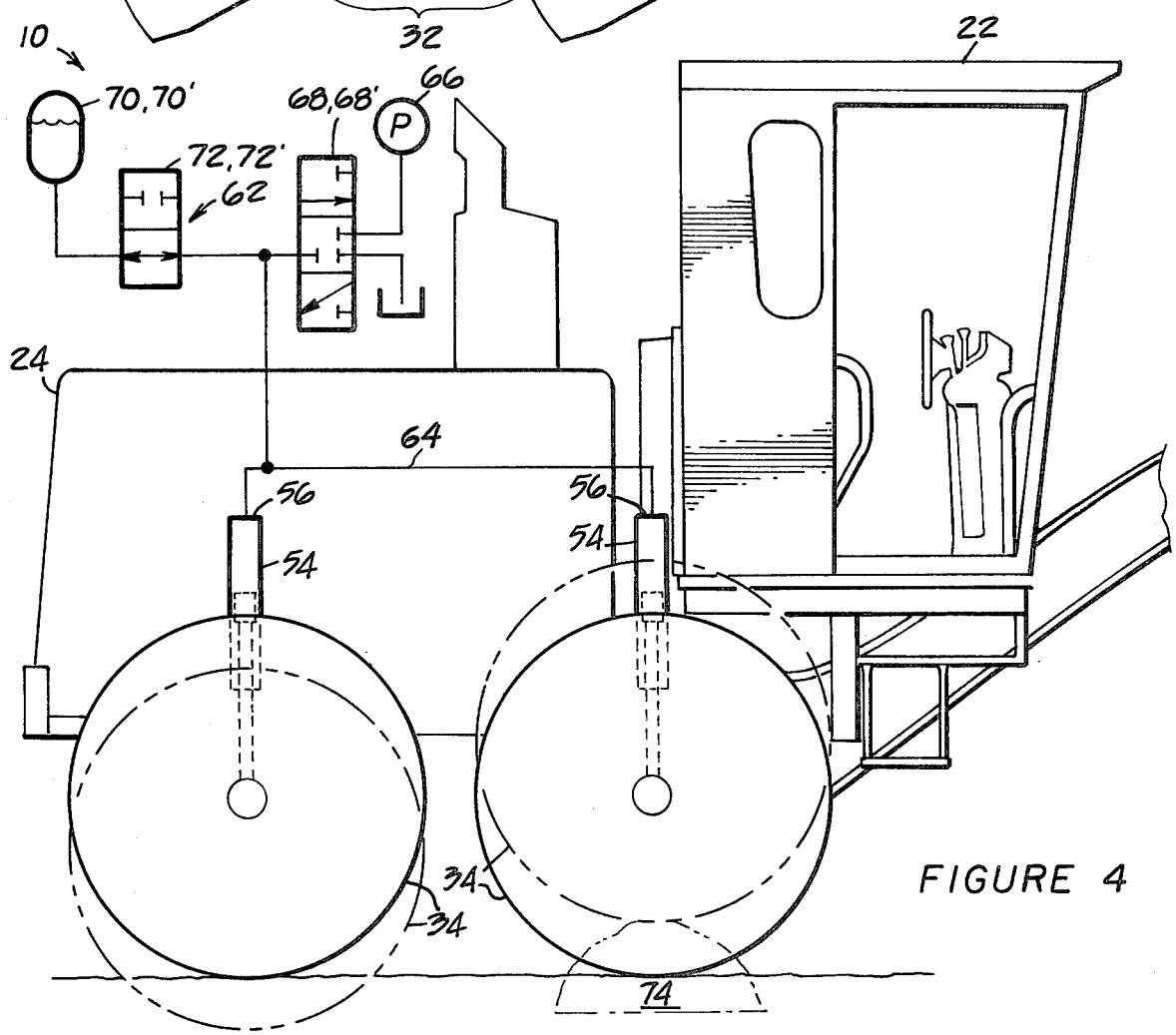
FIG. 4 illustrates, in partial side view partially schematically, a construction vehicle in accordance with the present invention.

Referring now primarily to FIG. 4, there is illustrated therein a hydraulic system 62 for controlling the action of the strut cylinders 54 of the second tandem roadwheel set 34. An identical hydraulic system 62' serves for controlling the action of the strut cylinders 54 of the first tandem roadwheels set 32 but this is not illustrated because of its identical nature. Briefly, a first conduit 64 serves to interconnect the expansion (in this case head) ends 56 of the two strut cylinders 54 of the second tandem roadwheel set 34. An operationally identical second conduit 64' interconnects the expansion ends 56' of the two strut cylinders 54 of the first tandem roadwheel set 32. A source of pressurized fluid, in the embodiment illustrated a pump 66 is provided which is supported by the vehicle 10. A first valve 68 serves to selectively couple the pressurized fluid source 66 with the first conduit 64. Similarly, second valve means 68' serve for selectively coupling the pressurized fluid source 66 with the second conduit 64'. The apparatus preferably includes accumulator means, in the embodiment illustrated a first accumulator 70 supported by the vehicle 10 along with means for selectively communicating the first accumulator 70 with the first conduit 64. In the embodiment illustrated the selective communicating means comprises a second valve 72. Similarly, a second accumulator 70' also supported by the vehicle 10 is provided and means, in the embodiment illustrated a second valve 72', serve for selectively communicating the second accumulator 70' with the second conduit means 64'.

The structure acts in the following manner. If, for example, the rightwardmost (in FIG. 4) of the second tandem roadwheel set 34 strikes a rock 74 and must ride over it, then fluid can flow from the strut cylinder 54 of this rightwardmost of the second tandem roadwheel set 34 to the strut cylinder 54 of the leftwardmost of the second tandem roadwheel set 34. This allows full traction to be kept by each of the roadwheels of the second tandem roadwheel set 34. The accumulator can serve as a shock absorber when the valve 72 is in the position illustrated in FIG. 4.

If the motor grader 10 is travelling along a slope with one lateral side thereof at a lower elevation than the other lateral side thereof, then through operator control of the valves 68 and 68' fluid from the pump 66 can be supplied to the head end 56 of the strut cylinders 54 on the lower elevation side of the motor grader 10 in a sufficient amount to expand these strut cylinders 54 and raise the cab 22 to a substantially, or at least a more, level position.

Adverting to FIG. 3, it will be seem that the present invention is particularly useful for operation with a brake 76 at each of the roadwheels of the first tandem roadwheel set 32 and of the second tandem roadwheel set 34 as is now generally required by OSHA regulations.

It will further be noted that because of the steering capability provided for the motor grader 10 by making each of the pairs of roadwheels 28 and 30 steerable, it is possible and even advantageous to operate, as illustrated, with a non-articulated frame 12.

While the invention has been described in connection with specific embodiments thereof, it will be understood that it is capable of further modification, and this application is intended to cover any variations, uses or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

The embodiments of the invention in which an exclusive property is claimed are defined as follows:

1. A construction vehicle, comprising:
   a frame;
   a first pair of steerable roadwheels mounted on opposite lateral sides of and adjacent a first end of said frame;
   a tandem roadwheel arrangement mounted adjacent a second end of said frame and comprising a second pair of steerable roadwheels, one mounted on a first and the other on a second lateral side of said frame and a third pair of steerable roadwheels, one mounted on the first and the other on the second lateral side of said frame intermediate the mounting of said second pair of roadwheels and said second end of said frame, the two roadwheels of said second and third pairs of roadwheels on said first side of said frame comprising a first tandem roadwheel set and the two roadwheels of said second and third pairs of roadwheels on said second side of said frame comprising a second tandem roadwheel set;

means for linking said second and third pairs of roadwheels for simultaneous coordinated angling thereof relative to said frame to accomplish steering thereof;

means for transmitting power to said tandem roadwheel arrangement;

four hydraulic strut cylinders, one for each of the roadwheels of said second and third pairs of roadwheels, each strut cylinder acting generally vertically between said frame and a respective roadwheel, each of said strut cylinders being rigidly connected at a cylinder end thereof to said frame and being rigidly connected at a rod end thereof to a respective one of said roadwheels; and means for causing said roadwheel angling means to act simultaneously to rotate the rods of said strut cylinders, thus utilizing said strut cylinders as pivotal kingpins with the rods thereof rotating within the cylinders thereof.

2. A vehicle as in claim 1, wherein said means for causing said roadwheel angling means to act simultaneously includes four expandable links, one for each of the roadwheels in said second and third pairs of roadwheels, each expandable link expanding between the respective rod end and cylinder end of each of said strut cylinders.

3. A vehicle as in claim 1, including an individual brake at each of said roadwheels.

4. A vehicle as in claim 1, wherein said frame is non-articulated.

5. A vehicle as in claim 4, including:

first conduit means interconnecting the expansion ends of the two strut cylinders of said first tandem roadwheel set;

second conduit means interconnecting the expansion ends of the two strut cylinders of said second tandem roadwheel set;

a source of pressurized fluid supported by said vehicle;

first valve means selectively coupling said pressurized fluid source with said first conduit means; and second valve means selectively coupling said pressurized fluid source with said second conduit means.

6. A vehicle as in claim 4, wherein said means for causing said roadwheel angling means to act simultaneously includes four expandable links, one for each of the roadwheels in said second and third pairs of roadwheels, each expandable link expanding between the respective rod end and cylinder end of each of said strut cylinders.

7. A vehicle as in claim 4, including an individual brake at each of said roadwheels.

8. A construction vehicle, comprising:

a frame;

a first pair of steerable roadwheels mounted on opposite lateral sides of and adjacent a first end of said frame;

a tandem roadwheel arrangement mounted adjacent a second end of said frame and comprising a second pair of steerable roadwheels, one mounted on a first and the other on a second lateral side of said frame and a third pair of steerable roadwheels, one mounted on the first and the other on the second lateral side of said frame intermediate the mounting of said second pair of roadwheels and said second end of said frame, the two roadwheels of second and third pairs of roadwheels on said first side of said frame comprising a first tandem roadwheel set and the two roadwheels of said second and third pairs of roadwheels on said second side of said frame comprising a second tandem roadwheel set;

means for linking said second and third pairs of roadwheels for simultaneous coordinated angling thereof relative to said frame to accomplish steering thereof, said roadwheel angling and second and third pairs of roadwheels linking means comprising a single motor;

means for transmitting power to said tandem roadwheel arrangement;

four hydraulic strut cylinders, one for each of the roadwheels of said second and third pairs of roadwheels, each strut cylinder acting generally vertically between said frame and a respective roadwheel, each of said strut cylinders being rigidly connected at a cylinder end thereof to said frame and being rigidly connected at a rod end thereof to a respective one of said roadwheel; and means for causing said roadwheel angling means to act simultaneously to rotate the rods of said strut cylinders, thus utilizing said strut cylinders as pivotal kingpins with the rods thereof rotating within the cylinders thereof.

9. A vehicle as in claim 8, including:

first conduit means interconnecting the expansion ends of the two strut cylinders of said first tandem roadwheel set;

second conduit means interconnecting the expansion ends of the two strut cylinders of said second tandem roadwheel set;

a source of pressurized fluid supported by said vehicle;

first valve means selectively coupling said pressurized fluid source with said first conduit means; and second valve means selectively coupling said pressurized fluid source with said second conduit means.

10. A vehicle as in claim 9, including:

a first accumulator supported by said vehicle;

a second accumulator supported by said vehicle;

means for selectively communicating said first accumulator with said first conduit means; and means for selectively communicating said second accumulator with said second conduit means.

11. A vehicle as in claim 10, wherein said frame is non-articulated.

12. A construction vehicle, comprising:

a frame;

a first pair of steerable roadwheels mounted on opposite lateral sides of and adjacent a first end of said frame;

a tandem roadwheel arrangement mounted adjacent a second end of said frame and comprising a second pair of steerable roadwheels, one mounted on a first and the other on a second lateral side of said frame and a third pair of steerable roadwheels, one mounted on the first and the other on the second lateral side of said frame intermediate the mounting of said second pair of roadwheels and said second end of said frame, the two roadwheels of said second and third pairs of roadwheels on said first side of said frame comprising a first tandem roadwheel set and the two roadwheels of said second and third pairs of roadwheels on said second side of said frame comprising a second tandem roadwheel set;

means for linking said second and third pairs of roadwheels for simultaneous coordinated angling thereof relative to said frame to accomplish steering thereof;

means for transmitting power to said tandem roadwheel arrangement;

four hydraulic strut cylinders, one for each of the roadwheels of said second and third pairs of roadwheels, each strut cylinder acting generally vertically between said frame and a respective roadwheel, each of said strut cylinders being rigidly connected at a cylinder end thereof to said frame and being rigidly connected at a rod end thereof to a respective one of said roadwheels;

first conduit means interconnecting the expansion ends of the two strut cylinders of said first tandem roadwheel set;

second conduit means interconnecting the expansion ends of the two strut cylinders of said second tandem roadwheel set;

a source of pressurized fluid supported by said vehicle;

first valve means selectively coupling said pressurized fluid source with said first conduit means; and second valve means selectively coupling said pressurized fluid source with said second conduit means.

13. A vehicle as in claim 12, including:
a first accumulator supported by said vehicle;
a second accumulator supported by said vehicle;
means for selectively communicating said first accumulator with said first conduit means; and
means for selectively communicating said second accumulator with said second conduit means.

14. A vehicle as in claim 13, wherein said frame is non-articulated.

15. A construction vehicle, comprising:
a frame;
a first pair of steerable roadwheels mounted on opposite lateral sides of and adjacent a first end of said frame;
a tandem roadwheel arrangement mounted adjacent a second end of said frame and comprising a second pair of steerable roadwheels, one mounted on a first and the other on a second lateral side of said frame and a third pair of steerable roadwheels, one mounted on the first and the other on the second lateral side of said frame intermediate the mounting of said second pair of roadwheels and said second end of said frame, the two roadwheels of said second and third pairs of roadwheels on said first side of said frame comprising a first tandem roadwheel set and the two roadwheels of said second and third pairs of roadwheels on said second side of said frame comprising a second tandem roadwheel set;
means for linking said second and third pairs of roadwheels for simultaneous coordinated angling thereof relative to said frame to accomplish steering thereof, said roadwheel angling and second and third pairs of roadwheels linking means comprising a single motor; and
means for transmitting power to said tandem roadwheel arrangement.

* * * * *